(12) United States Patent
Aljabri

(10) Patent No.: US 9,894,240 B1
(45) Date of Patent: Feb. 13, 2018

(54) DOCUMENT FORGERY DETECTION SYSTEM

(71) Applicant: Amer Said Rabia Mubarak Aljabri, Dubai (AE)

(72) Inventor: Amer Said Rabia Mubarak Aljabri, Dubai (AE)

(*) Notice: Subject to any disclaimer, the term of this patent is extended or adjusted under 35 U.S.C. 154(b) by 0 days.

(21) Appl. No.: 15/222,101

(22) Filed: Jul. 28, 2016

(51) Int. Cl.
| | | |
|---|---|---|
| *H04N 1/04* | (2006.01) | |
| *H04N 1/32* | (2006.01) | |
| *B42D 25/21* | (2014.01) | |
| *B42D 25/387* | (2014.01) | |
| *B42D 25/333* | (2014.01) | |
| *G06K 9/00* | (2006.01) | |
| *H04N 1/00* | (2006.01) | |
| *H04N 1/028* | (2006.01) | |
| *H04N 1/393* | (2006.01) | |
| *H04N 1/10* | (2006.01) | |

(52) U.S. Cl.
CPC ......... *H04N 1/32352* (2013.01); *B42D 25/21* (2014.10); *B42D 25/333* (2014.10); *B42D 25/387* (2014.10); *G06K 9/00469* (2013.01); *H04N 1/0066* (2013.01); *H04N 1/00244* (2013.01); *H04N 1/00559* (2013.01); *H04N 1/00824* (2013.01); *H04N 1/02815* (2013.01); *H04N 1/1061* (2013.01); *H04N 1/393* (2013.01)

(58) Field of Classification Search
CPC .... H04N 2201/3236; H04N 2201/3239; G06F 21/608; G06F 21/64; G06K 15/02; G06K 19/067; G06K 19/10; G06K 2009/4666; G06K 2215/0071; G06K 2215/0082; G06K 9/00449; G06K 9/00744; G06K 9/2063
USPC .... 358/1.14, 3.28, 1.15, 1.9, 1.16, 2.1, 2.99, 358/400; 382/100, 135, 286; 713/176, 713/186; 399/366; 235/375, 380, 382, 235/462.01; 709/229
See application file for complete search history.

(56) References Cited

U.S. PATENT DOCUMENTS

| | | | | |
|---|---|---|---|---|
| 5,661,552 | A | * | 8/1997 | Nishigai .................. G07D 7/10 250/556 |
| 6,373,965 | B1 | * | 4/2002 | Liang ..................... B41M 3/144 382/112 |
| 6,408,330 | B1 | * | 6/2002 | DeLahuerga ......... A61J 1/1437 709/217 |

(Continued)

*Primary Examiner* — Negussie Worku
(74) *Attorney, Agent, or Firm* — Hayes Soloway PC

(57) ABSTRACT

There is provided a document forgery detection system adapted to have an advanced level of document verification and scanning structure against forgery, whereby the documents gets verified by various verification methods. The forgery detection system comprises a scanning device adapted to scan the document for verification and to compare the scanned image to an original image of the document stored in a remote server associated to a relevant authority. The forgery detection system comprises a verification device adapted to receive and secure the document in place in an angle adjustable configuration, project visible and ultraviolet light on the document for exposing visible light and ultraviolet light exposable embedded marks within the document and reflect these marks to a display in optical communication with the operator. The verification device comprising a magnifier with a visible light lens and a red lens for enabling visualization of embedded marks within the document.

20 Claims, 14 Drawing Sheets

(56) References Cited

U.S. PATENT DOCUMENTS

| | | | |
|---|---|---|---|
| 6,603,871 B2* | 8/2003 | Liang | G06K 9/2018 |
| | | | 356/71 |
| 6,658,403 B1* | 12/2003 | Kuroda | G06Q 10/10 |
| 6,882,737 B2* | 4/2005 | Lofgren | G06K 9/00 |
| | | | 382/100 |
| 8,127,989 B2* | 3/2012 | Choi | G07C 9/00087 |
| | | | 235/382 |
| 9,165,336 B2* | 10/2015 | Scholz | G07D 7/08 |
| 9,443,298 B2* | 9/2016 | Ross | G06K 9/00449 |
| 2004/0050936 A1* | 3/2004 | Look | G09F 3/0292 |
| | | | 235/462.1 |
| 2004/0066273 A1* | 4/2004 | Cortina | G06K 7/0008 |
| | | | 340/5.1 |
| 2006/0074986 A1* | 4/2006 | Mallalieu | G07C 9/00087 |
| 2012/0150745 A1* | 6/2012 | Csulits | G07D 7/00 |
| | | | 705/45 |
| 2015/0178692 A1* | 6/2015 | Nishida | G07D 11/0003 |
| | | | 705/45 |
| 2017/0094516 A1* | 3/2017 | Martinez De Velasco Cortina | H04W 12/06 |

* cited by examiner

DOCUMENT FORGERY DETECTION SYSTEM

FIELD OF THE INVENTION

The present invention generally relates to systems and methods for verifying the authenticity of official documents, and more particularly, to an enhanced document forgery detection system.

BACKGROUND OF THE INVENTION

Technologies for scanning and detecting the authenticity of forged documents are existing in the prior art. However, the production of forgery documents by criminals are continuously becoming more high-tech using the upgraded technologies not being detected in traditional detecting systems and thus enhancing crimes for the production of forgery documents using printing technology. These forgery documents include official documents such as currency notes, passports, and visa papers which are increasingly similar and hard to detect from the originals.

Traditional verification systems include scanning devices used for scanning the official documents and comparing these to the original documents. These systems also include verification devices comprising magnifiers for magnifying writings and hidden marks in these documents. In the traditional systems, scanning devices are provided separately from manual checking devices where officials scan first the documents and only if these documents are reported to be unauthentic, the officials proceed with the manual checking of the documents. This process is particularly true for passport verification by immigration officials during the immigration verification procedure in the airports.

Normally, immigration officials need to attend to separate equipment located at different locations for the manual verification of passports in case where the document fails the scanning test. Scanning verification is normally conducted by scanning the passport and comparing the scanned image to an original document stored in a remote database. This is as original copies of passports are normally stored in databases held by official governmental authorities to which access is provided to immigration authorities in official checking points such as airports.

Among the drawbacks is that these scanning devices are not hundred percent accurate as they generally scan and compare visible data only of the official documents. It often occurs that the scanning devices report an official document as authentic when it is not, and the contrary is also true. When the official documents are reported to be authentic by the scanning devices, no further check is normally conducted and the official document is authenticated by the official. The document holder is successfully authenticated and approved access to the country (in case of immigration checkup), notwithstanding the risk that this official document be still counterfeited. This is as the traditional scanning devices have functional limitations and are not integrated with other manual checking devices for hard-proof authenticity.

Manual verification devices are normally provided with a visible light source and a ultraviolet light source adapted to project light on the documents for verification, in addition to a magnifier to enable to the official to detect embedded marks inside the documents such as hidden marks, water marks, magnetic ink taping and so on. These manual verification devices traditionally operate independently of the scanning devices, where in airports for example, they are used only when the verified documents are first reported counterfeited by the scanning devices. Also, the traditional manual verification devices are not secure as they are designed such that the ultraviolet light may be exposed to human body. For example, this can occur as documents for verification are traditionally held manually by the officials during the check which may expose the officials (or other users) to the ultraviolet radiation being projected. This is a major drawback which may affect the health of the users (such as officials) operating the manual verification devices. Also, these traditional manual devices are unpractical, inaccurate and time consuming to use for the verification of documents which may be dissuasive to users especially during rush time or when the users have a number of document target to process during the day. These drawbacks traditionally occur in part because the document to be verified needs to be held manually by the official according to an accurate angle for the hidden marks to be exposed and verified. However, this angle inclination of the document is hard to obtain accurately and quickly which imposes a limitation on the use, efficiency and security of these traditional devices.

SUMMARY OF THE INVENTION

Therefore, there is provided a document forgery detection system which would overcome the above mentioned drawbacks.

As a first aspect of the invention, there is provided a document forgery detection system comprising:
a verification device comprising:
   a verification device housing having a front portion, a rear portion, a top portion and a base portion;
   a document receiver for receiving a document for verification having a document front portion and a document rear portion extending along a document plan, the document receiver being positioned between the housing front portion and the housing rear portion such that the document front portion faces the verification device housing front portion and the document rear portion faces the verification device housing rear portion when inserted inside the reader;
   a visible light source positioned between the document reader and the verification device housing rear portion adapted to project visible light from behind the document in direction of the rear portion of the document for enabling reflectance of visible light embedded marks inside the document;
   an ultraviolet light source positioned between the document reader and the verification device housing front portion adapted to project ultraviolet light from in front the document in direction of the front portion of the document for enabling reflectance of ultraviolet light embedded marks inside the document;
   a screen comprising a display defined within the verification device housing front portion, the display having an optically transparent material for enabling visualization of the visible light embedded marks and the ultraviolet light embedded marks to an operator during operation of the verification device; and
   a power supply unit adapted to supply power to the visible light source and to the ultraviolet light source.

Preferably, the document receiver comprises a support member having a support member plan adapted to provide a support to the document along the support member plan when the document is inserted inside the document receiver such that the document plan extends along the support member plan.

Preferably, the document receiver further comprises an inclination angle adjuster for adjusting an inclination angle of the document with respect to the projected visible white and ultraviolet light in order to enable improving the reflectance of the visible light exposable embedded marks and the ultraviolet light exposable embedded marks for visualization by the operator through the display.

Preferably, the document receiver is adapted to receive the document through a first housing opening defined in the verification device housing top portion, and wherein the inclination angle adjuster comprises an angle adjuster handle extending outwardly from the housing first opening for enabling the operator to adjust the inclination angle.

Preferably, the document receiver further comprises a document holder adapted to secure the document plan in place along the support member plan.

Preferably, the document holder comprises a string and is adapted to be in a relaxed position when the document receiver is empty and to be in a tensed position when the document is inserted inside the document receiver for enabling the document to remain in place with the document plan coinciding with the support member plan when inserted.

Preferably, the visible light source is mounted on the verification device housing rear portion.

Preferably, the ultraviolet light source is mounted on the verification device housing front portion.

Preferably, the screen comprises a frame extending around the display, the frame being adapted to be mounted to the verification device housing front portion within a housing second opening defined in the verification device housing front portion such that that the housing second opening is completely obstructed by the screen, and wherein the ultraviolet light source is mounted on the frame.

Preferably, the ultraviolet light source comprises a first ultraviolet light source having a first ultraviolet scale index and a second ultraviolet light source having a second ultraviolet scale index different from the first scale index.

Preferably, the first ultraviolet light source is mounted on a top edge of the frame and the second ultraviolet light source is mounted on a bottom edge of the frame.

Preferably, the first ultraviolet scale index is 1 and the second ultraviolet scale index is between 3 and 6.

Preferably, the display optically transparent material is made of glass or plastic.

Preferably, the verification device further comprises a magnifier apparatus comprising a magnifier comprising a magnifying glass lens for enabling the enlargement of visible light exposable embedded marks and a red lens for enabling the visualization of ultraviolet light exposable embedded marks.

Preferably, the magnifier apparatus further comprises a flexible support member adapted to be coupled to the magnifier from one end and to be coupled to the verification housing from another end, wherein the flexible support member is adapted to flex for enabling the operator to move the magnifier in proximity and away from the display as required.

Preferably, the document is a passport, a visa document, an identification document, a currency note or a bank note.

Preferably, the verification device further comprises a selector for enabling the operator to select and activate a desirable light source among the light sources.

Preferably, the document forgery detection system further comprises;
a scanning device comprising:
    a scanning device housing having a front portion, a rear portion, a top portion and a base portion;
    an optically transparent scanning screen defined within the scanning device housing front portion such that an upper edge of the scanning screen is in abutment position with a peripheral edge of the scanning device housing top portion for enabling a first document part to be supported on the scanning device top portion and a second document part to extend downwardly facing the scanning screen;
    a visible light camera mounted inside the scanning device housing and oriented in direction of the scanning screen for capturing a visible light image of the document second part when extended facing the scanning screen;
    a ultraviolet camera mounted inside the scanning device housing and oriented in direction of the scanning screen for capturing an ultraviolet image of the document second part when extended facing the scanning screen;
    a data network interface adapted to be connected to a remote server through a data network;
    a user interface;
    a processing unit adapted to be connected to the visible light camera, the ultraviolet camera, the data network interface and the user interface for obtaining a visible light image and an ultraviolet image of the document being verified, for extracting a visible light image and ultraviolet image of the original document from the remote server, for comparing the visible light and ultraviolet images of the document being verified with the visible and ultraviolet images of the original document for determining if there is a match, and for displaying comparison results to the operator through the user interface, the comparison results comprising a window of images displaying the visible light image of the verified document next to the visible light image of the original document and the ultraviolet image of the verified document next to the ultraviolet image of the original document, wherein the visible light image comprises a black/white image and a colored image; and
    a power supply unit adapted to supply power to the cameras and to the processing unit.

Preferably, the verification device is adapted to be mounted on the scanning device such that at least a part of the scanning device top portion is adapted to receive and support at least a part of the verification device base portion.

Preferably, the scanning device user interface is adapted to receive a decision signal from the operator as to whether the document is approved or rejected and for transmitting the decision signal to the processing unit of the scanning device, wherein the processing unit of the scanning device is connected to the verification device for receiving a confirmation signal that the visible light source and the ultraviolet light source have been activated confirming that the verification of the document by the operator using the verification device before approving the operator decision.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

Figure 1:
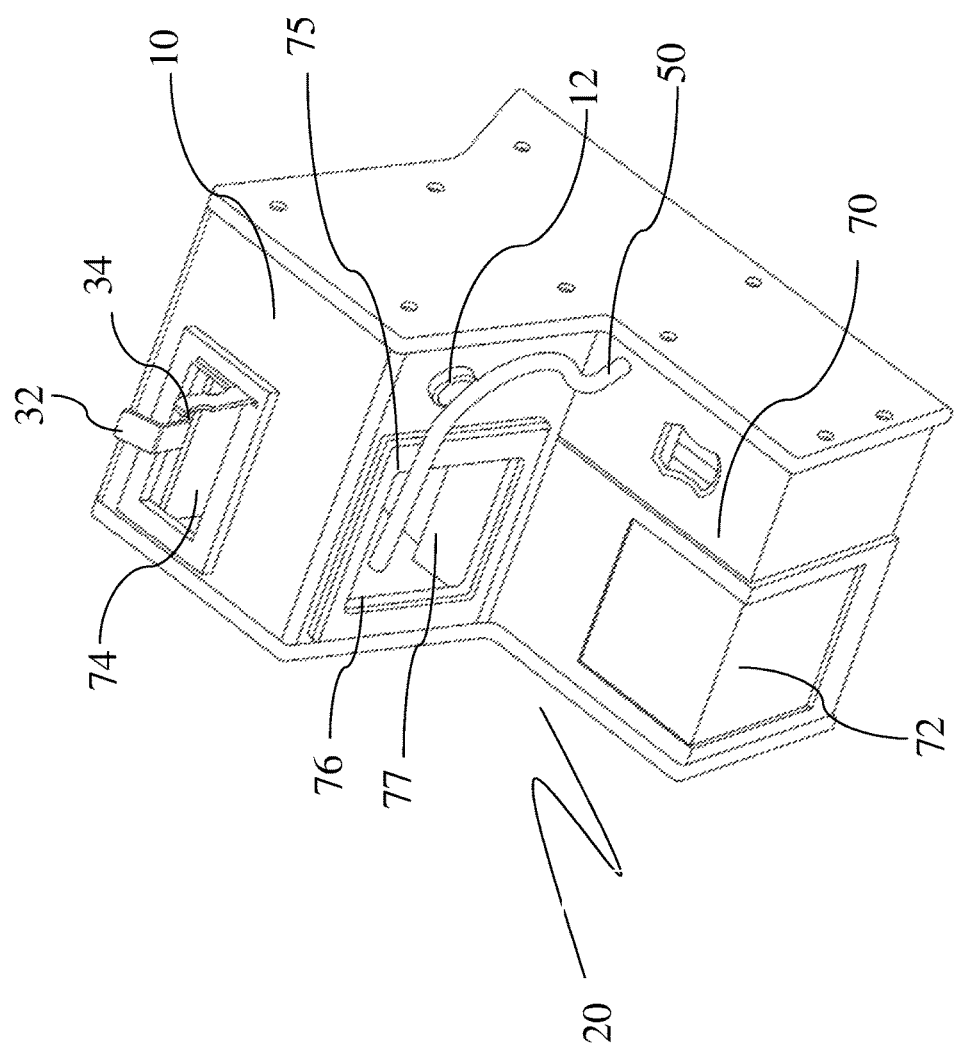
FIG. 1 illustrates a perspective view of a document forgery detection system in accordance with an embodiment of the invention.

In an embodiment, referring to FIG. 1, there is provided a document forgery detection system 20 adapted to have an advanced level of document verification structure and process against forgery, whereby the documents gets verified by various verification methods and devices efficiently and quickly.

In an embodiment of the invention, referring to FIGS. 1 to 14, the forgery detection system 20 comprises a scanning device 14 adapted to scan the document 134 for verification and to compare the acquired scanned image of the document 134 to an original image of the document 134 stored in a remote server 107 associated to a relevant authority.

In an embodiment of the invention, the document forgery detection system 20 comprises a verification device 15 adapted to receive the document 134, project light on the document 134 for exposing embedded marks within the document 134 and magnify the embedded marks for enabling the visualization of embedded marks within the document 134 to an operator using a naked eye In an embodiment of the invention, the light comprises visible light 130 and ultraviolet light 90.

In an embodiment of the invention, the document forgery detection system 20 is designed with enhanced safety standards for both the operator and any surrounding human beings.

Verification Device:

In an embodiment of the invention, the verification device 15 comprises an ultraviolet proof structure adapted to isolate ultraviolet radiation from the external environment avoiding any risk of ultraviolet exposure by the operator or other human bodies when the ultraviolet light is activated during the document verification process.

In an embodiment of the invention, referring to FIGS. 1 to 13, the verification device 15 comprises a housing 10, a visible light source 130, an ultraviolet light source 90, a document receiver 74, a screen 76, a magnifier apparatus 51 and a power supply unit. The screen 76 comprises a display made of optically transparent material such as glass or plastic. The housing 10 is made of ultraviolet proof material, such as metallic material, restricting passage of ultraviolet radiation outside the housing 10. The visible light source 130, the ultraviolet light source 90 and at least a part as the document receiver 74 are adapted to be mounted inside the housing 10. The housing 10 comprises a first opening aligned in position with the document receiver 74 for enabling passage of a document 134 through the housing 10 inside the document receiver 74 to be held and secured in place for verification. The housing 10 first opening is preferably in the form of a slit having a first and second ends intermediate the housing first 06 and second side 07 portions. The housing 10 first opening is also positioned intermediate the front 04 and rear portions 05 of the housing 10. The housing 10 comprises a second opening adapted to enable the screen 76 to be mounted to the housing 10 such that the opening is completely obstructed by the screen 76 when mounted in place.

In an embodiment of the invention, referring to FIGS. 1 to 8, the housing 10 has a top portion 02, a base portion 03, a front portion 04, a rear portion 05, a first side portion 06 and a second side portion 07. In an embodiment of the invention the first opening is located at the housing top portion 02 and the second opening is located at the housing front portion 04. When the verification device 15 is mounted and in operation, the housing front portion 04 is adapted to be oriented facing the operator for enabling the latter to visualize the document 134 through the screen 76 when the document 134 is inserted inside the document receiver 74 through the housing 10 first opening located at the housing top portion 02.

Figure 10:
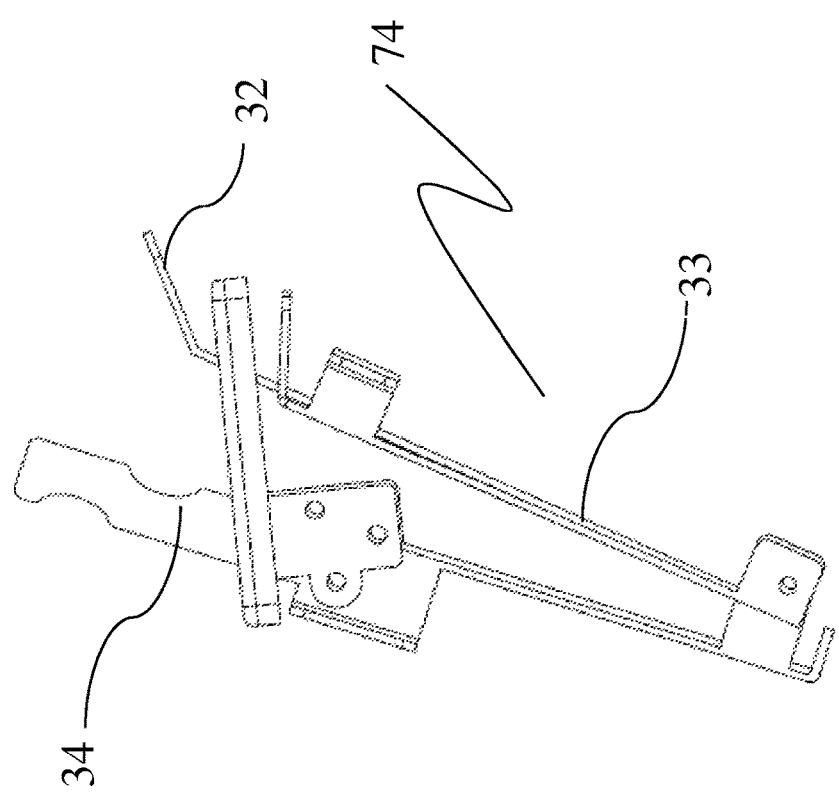
FIG. 10 illustrates a side view of a document receiver in accordance with an embodiment of the invention.
Figure 11:
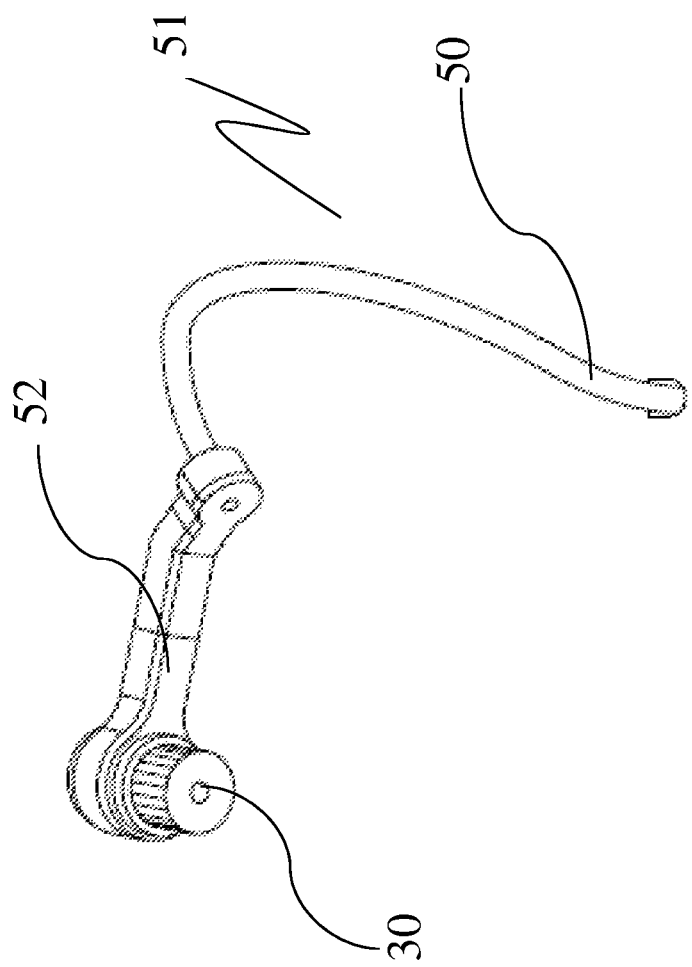
FIG. 11 illustrates a perspective view of a magnifier apparatus of a verification device in accordance with an embodiment of the invention.

In an embodiment of the invention, referring to FIG. 10, the document receiver 74 has a longitudinal length along a longitudinal axis and extends longitudinally from a first side end to a second side end. The document receiver 74 has also a height along a vertical axis and extends vertically from a top end to a low end along the vertical axis. The document 134 is adapted to be mounted along the longitudinal axis intermediate the housing first 06 and second side portions 07 and along the vertical axis intermediate the housing top 02 and base 03 portions and intermediate the housing front 04 and rear portions 05. Preferably, the document holder 32 first and second side ends coincide with the first and second ends of the housing 10 first opening.

In an embodiment of the invention, referring to FIGS. 1 to 4, 10, 12 and 13, the document holder 32 is adapted to receive a document 134 through the first opening such that the data imprinted on the document 134 is in optical communication with the display of the screen 76 positioned on the housing front portion 04 such that the document 134 imprinted data is visible to the operator of the device 15 through the display 77 of the screen 76. In such a configuration, the document holder 32 (and the document 134 inserted therein) has a document 134 front portion facing the housing front portion 04 and a document 134 rear portion facing the housing rear portion 05.

Figure 13:
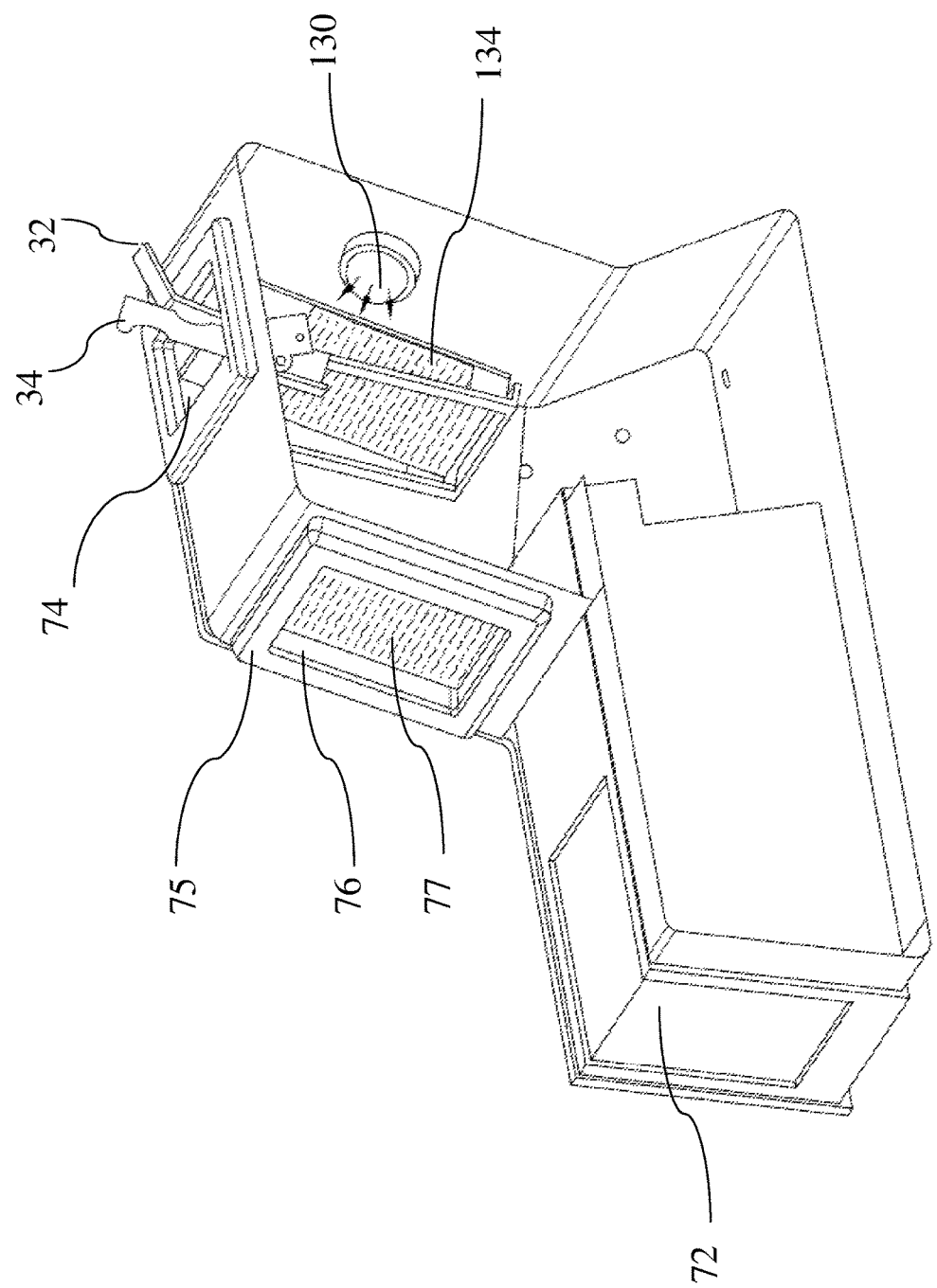
FIG. 13 illustrates a perspective view from the front side of the internal components of the verification device of the of the document forgery detection system in accordance with an embodiment of the invention.

In an embodiment of the invention, referring to FIG. 13, the visible light source 130 is adapted to be mounted such that the visible light when activated is projected in the direction of the document 134 rear portion. Preferably, the visible light source 130 is adapted to be mounted to the housing rear portion 05.

Figure 12:
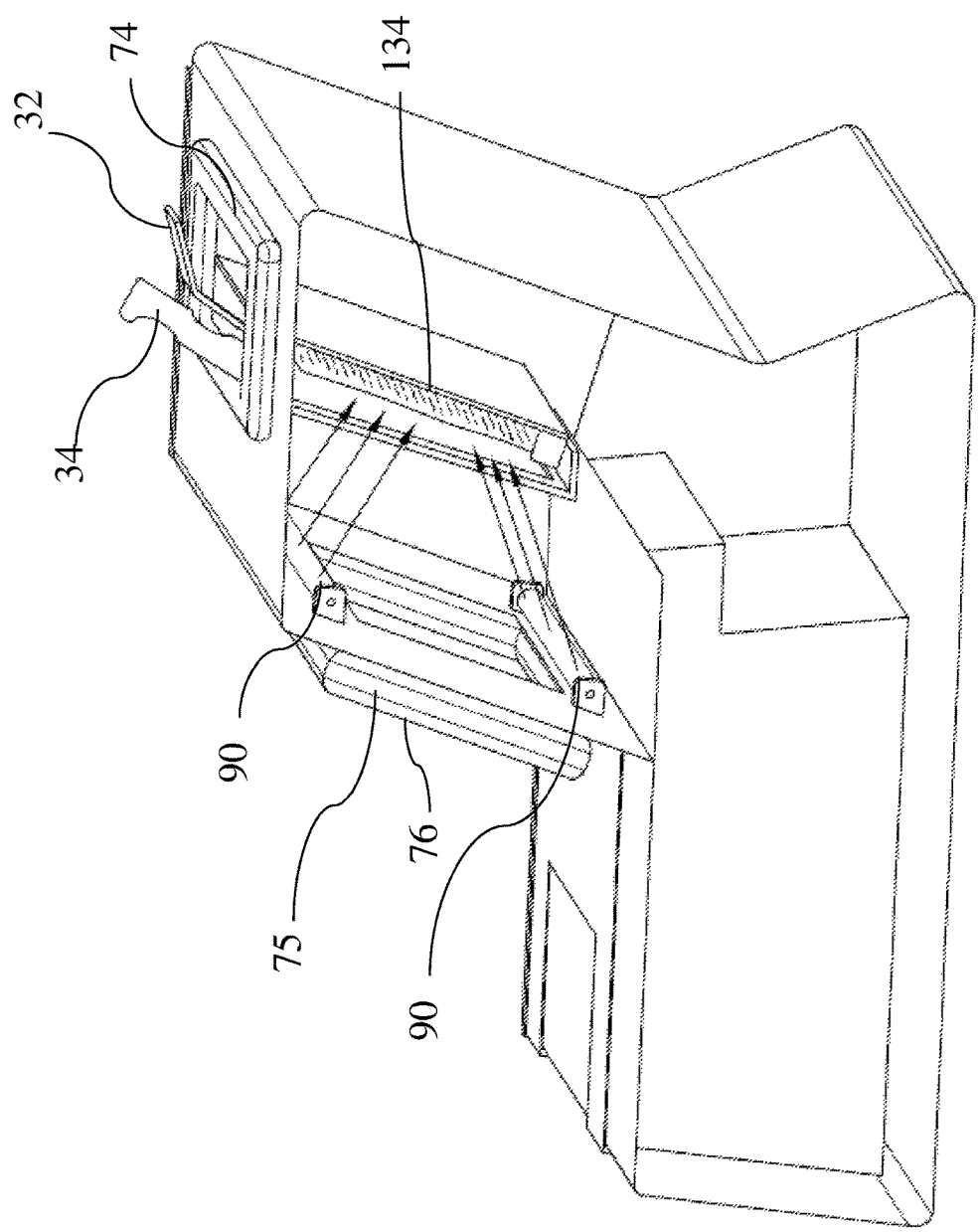
FIG. 12 illustrates a perspective view from the back side of the internal components of the verification device of the of the document forgery detection system in accordance with an embodiment of the invention.

In an embodiment of the invention, referring to FIGS. 1 and 12, the ultraviolet light source 90 is adapted to be mounted such that the ultraviolet light 90 when activated is projected in the direction of the document 134 front side opposite the direction of the display 77. In an embodiment of the invention, the ultraviolet light source 90 adapted to be mounted to the housing 10 front portion 04 in such a manner that the ultraviolet light 90 when activated projects in the direction of the document 134 front side opposite the direction of the display 77.

In an embodiment of the invention, the ultraviolet light source 90 comprises various ultraviolet sources with respective various indexes.

Figure 9:
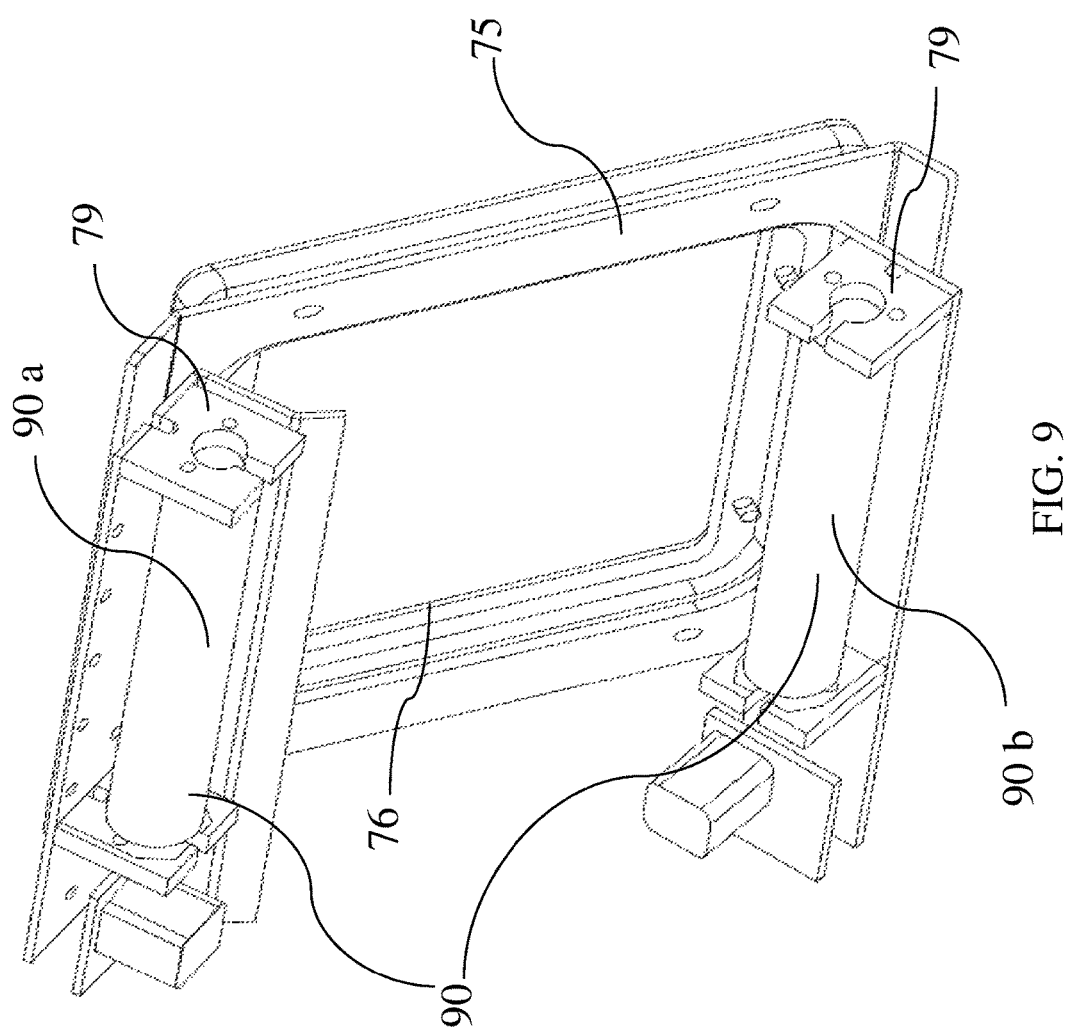
FIG. 9 illustrates a perspective view of a verification device with UV sources in accordance with an embodiment of the invention.

In another embodiment of the invention, referring to FIG. 9, the screen 76 comprises a frame 75 having an internal frame portion and a mounting mechanism 79 coupled to the frame 75 internal portion adapted to mount and secure in place the ultraviolet light source 90. The frame 75 internal portion is positioned entirely inside the housing 10 when the screen 76 is mounted to the housing 10 through the housing second opening.

In an embodiment of the invention, referring to FIGS. 9 and 12, the ultraviolet light source 90 comprises a first light source 90a adapted to be mounted on a top portion of the frame 75 and second ultraviolet light source 90b adapted to be mounted on a low portion of the frame 75 such that the display 77 is positioned intermediate the first 90a and second 90b ultraviolet light sources 90. The first and second ultraviolet sources 90 a and 90b are adapted to project ultraviolet light 90 on the front portion of the document 134 such that the entire document 134 front portion is exposed to the ultraviolet light. In an embodiment of the invention, first ultraviolet light source 90a has a first index and the second ultraviolet light source 90b has a second index different from the first index. In an embodiment of the invention, the first UV index is 1 and the second UV index is in the range of 3-6.

According to the above configuration, referring to FIG. 13, when the document 134 to be verified is inserted inside the document receiver 74, the visible light 130 is projected to the document 134 from behind, through the document 134 rear portion, enabling the reflectance of visible light exposable embedded marks, such as water marks. The ultraviolet light 90 is projected to the document 134 from the front, through the document 134 front portion, enabling the reflectance of ultraviolet light exposable hidden marks, such as fluorescent dyes. As the document 134 is in optical communication with the display, this would enable the operator to visualize these visible and ultraviolet light exposable embedded marks.

The power supply unit is adapted to supply power to the electrical/electronic components of the device 15 including the visible 130 and UV light 90 sources.

In an embodiment of the invention, referring to FIG. 10, the document receiver 74 comprises an inclination angle adjuster 34 adapted to adjust the inclination angle of the document 134 with respect to the projected light when inserted inside the document receiver 74. The inclination angle adjuster 34 is adapted to enable the operator to vary the inclination angle of the document 134 with respect to the projected light (visible light 130 or ultraviolet light 90) during the verification process.

In an embodiment of the invention, referring to FIGS. 1, 3-6 and 11-12, the document receiver 74 comprises a support member 33 having a support member plan adapted to provide a support to the document 134 and secure the document 134 in place along the support member plan when the document 134 is inserted in the document receiver 74. Preferably, the inclination angle adjuster 34 enables adjusting the inclination angle of the support member plan by varying the inclination angle of the support member 33. When the document 134 is appropriated inserted and secured in place inside the document receiver 74 and held in place using the support member 33, the document 134 would extend along the same plan as the support member plan. The variation of inclination angle of the support member plan leads to the same variation of the inclination angle of the document 134. In an embodiment of the invention, the inclination angle adjuster 34 comprises an angle adjuster handle extending outwardly from the housing 10 first opening for enabling the operator to manipulate the inclination angle adjuster 34.

In an embodiment of the invention, referring to FIG. 10, the support member 33 comprises a document holder 32 adapted to hold and secure the document 134 in place along the support member plan when inserted inside the receiver to restrict any movement of the document 134 with respect to the support member plan during the verification process. In an embodiment of the invention, the document holder 32 comprises a spring based mechanism adapted to force the document holder 32 to be in a relaxed position when the document receiver 74 is empty and to force the document holder 32 to extend to a tensed position when a document is inserted inside the document receiver 74. The tensed position of the document holder 32 allows the latter to apply force on the document 134 to secure it in place along the support member plan. When the document 134 is retrieved and withdrawn from the document receiver 74, the spring is relaxed and the document holder 32 goes back in a relaxed position. The document holder 32 preferably comprises a document holder handle extending outwardly from the housing first opening to enable the operator to manipulate the document holder 32 while inserting and withdrawing the document 134 from the document receiver 74.

In an embodiment of the invention, the display 77 optically transparent material is resistant to ultraviolet radiations. In an embodiment of the invention, housing 10 is made of ultraviolet (UV) proof material such as UV resistant plastic or metal.

In an embodiment of the invention, referring to FIGS. 1-3, 12 and 13, the verification device 15 further comprises a selector 12 adapted to enable the operator to select the light source desired among the visible light source 130 and the various ultraviolet light sources 90 available.

When the operator desires to verify the visible light exposable embedded marks, the operator uses the selector 12 to select the visible light source. When the operator desires to verify the UV light exposable embedded marks, the operator selects the desired UV light sources 90 among the available UV light sources 90*a* and 90*b*.

In an embodiment of the invention, referring to FIGS. 1, 12 and 13, the activation of the visible 130 and UV light sources 90 is conducted using activation members connected to their respective light sources. In an embodiment of the invention, the activation members are switch on/off buttons mounted on the device housing 10. In another embodiment of the invention, the activation members are connected to the selector 12 such as the appropriate light source is automatically activated when the operator selects the light source desired.

In an embodiment of the invention, referring to FIGS. 1, 5 to 8 and 11, the magnifier apparatus 51 comprises a magnifier 52 mounted to a flexible support member 50 adapted to enable the operator to manipulate and vary the position of the magnifier 52. Preferably, the flexible support member 50 is coupled to the device 15 housing 10 from one end and to the magnifier 52 from another end. In an embodiment of the invention, the magnifier 52 comprises a magnifying glass lens 30 and a red lens. Preferably, the magnifying glass lens 30 is adapted to magnify in the range of 20×.

Scanning Device

In an embodiment of the invention, referring to FIGS. 1 to 4 and 14, the scanning device 14 comprises a housing 70, a visible light camera 104, a UV camera 106, a scanning screen 72, a user interface 102, a processing unit 108, a memory, a display interface 100, a power supply unit and a data network interface 111 adapted to be connected to the data network 112 which is further interlinked to the remote server 107. The scanning screen 72 is made of optically transparent material such as glass or plastic. The housing 70 is made of ultraviolet proof material, such as metallic material, restricting passage of ultraviolet radiation outside the housing 70. The visible light camera 104 and the ultraviolet camera 106 are adapted to be mounted inside the housing 70. The housing 70 comprises an opening adapted to enable the scanning screen 72 to be mounted to the housing 70 such that the opening is completely obstructed by the screen 72 when mounted in place.

Figure 2:
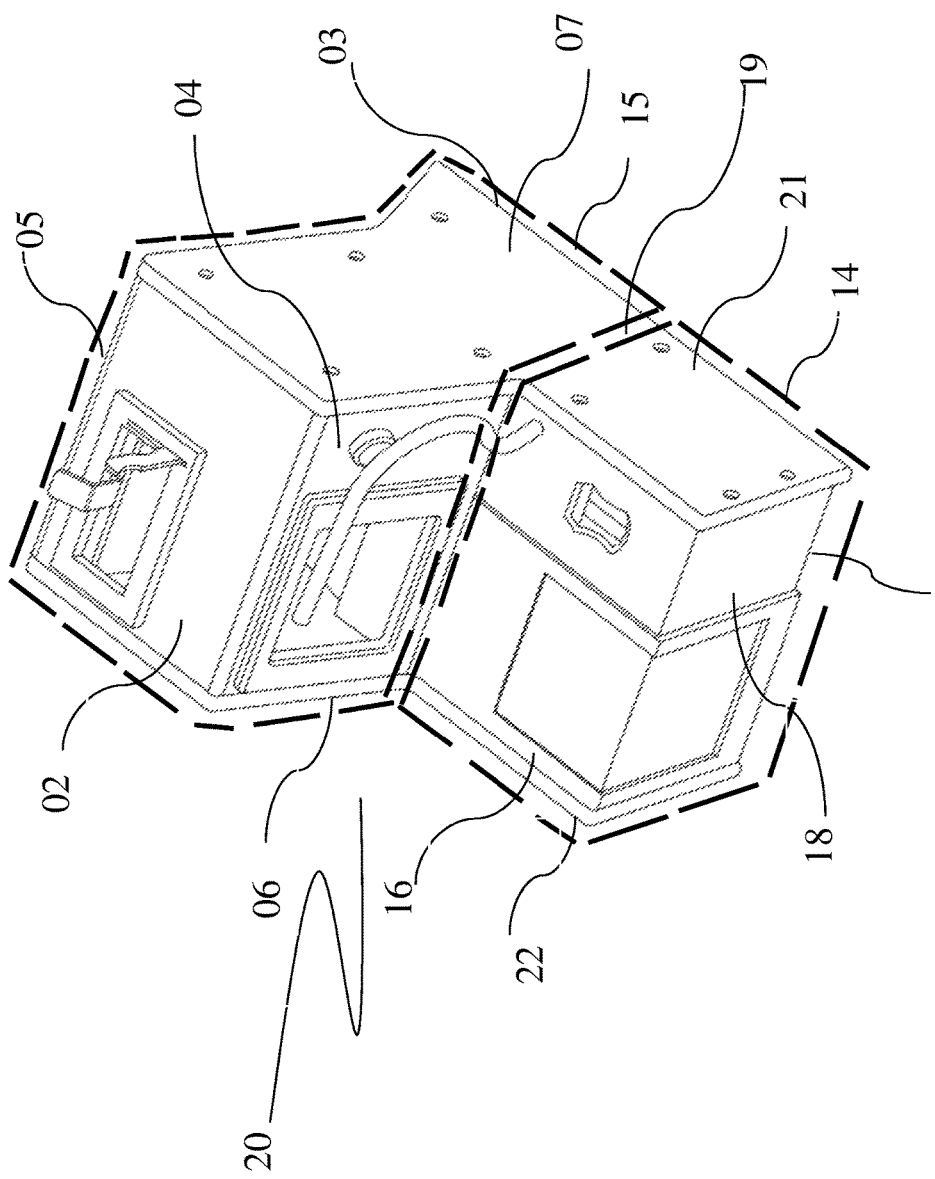
FIG. 2 is a perspective view of the document forgery detection system illustrating the locations of a scanning and verification device in accordance with an embodiment of the invention.
Figure 3:
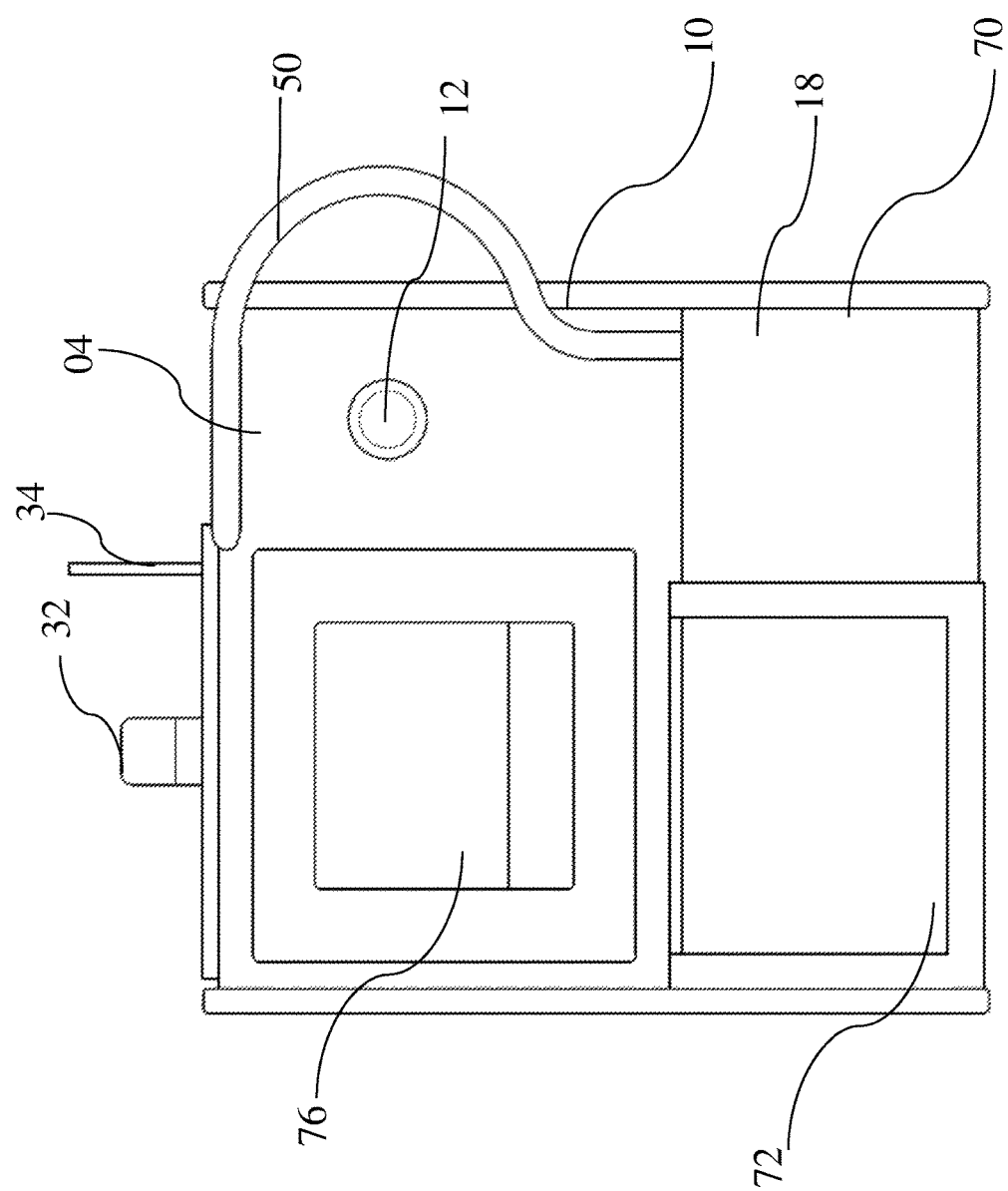
FIG. 3 illustrates a front side view of the document forgery detection system of FIG. 1.
Figure 4:
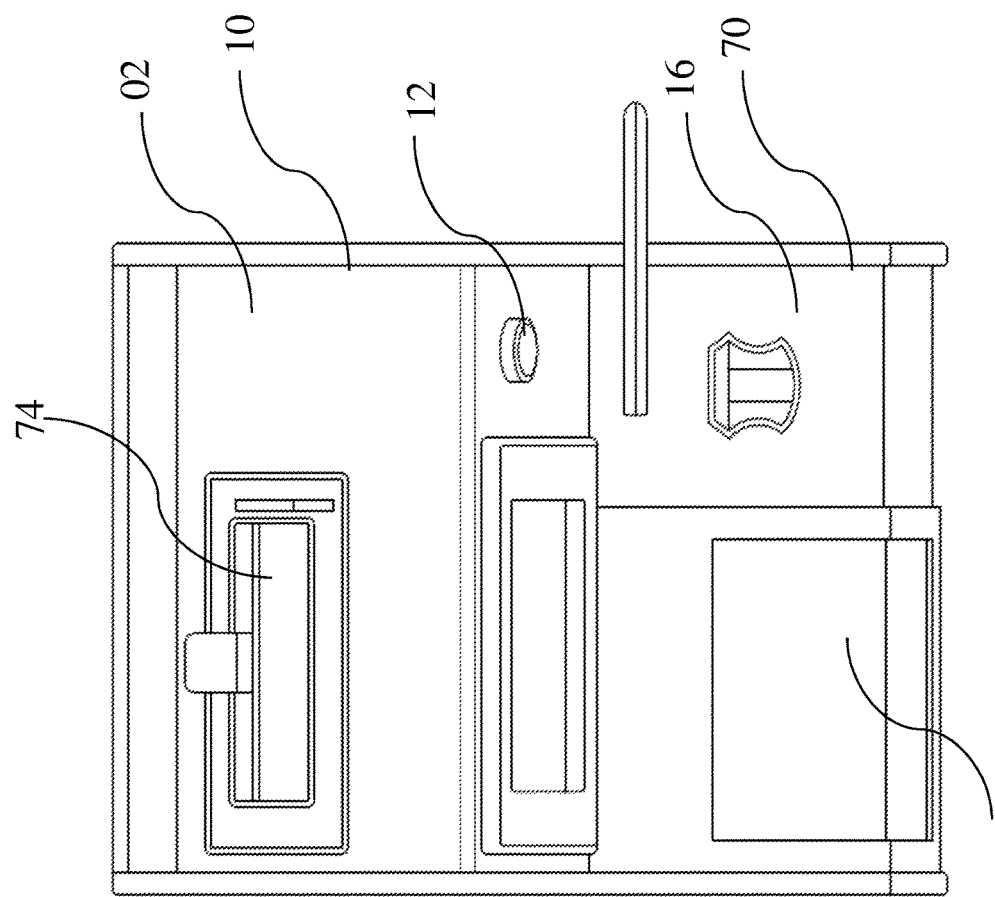
FIG. 4 illustrates a top view of the document forgery detection system of FIG. 1.
Figure 5:
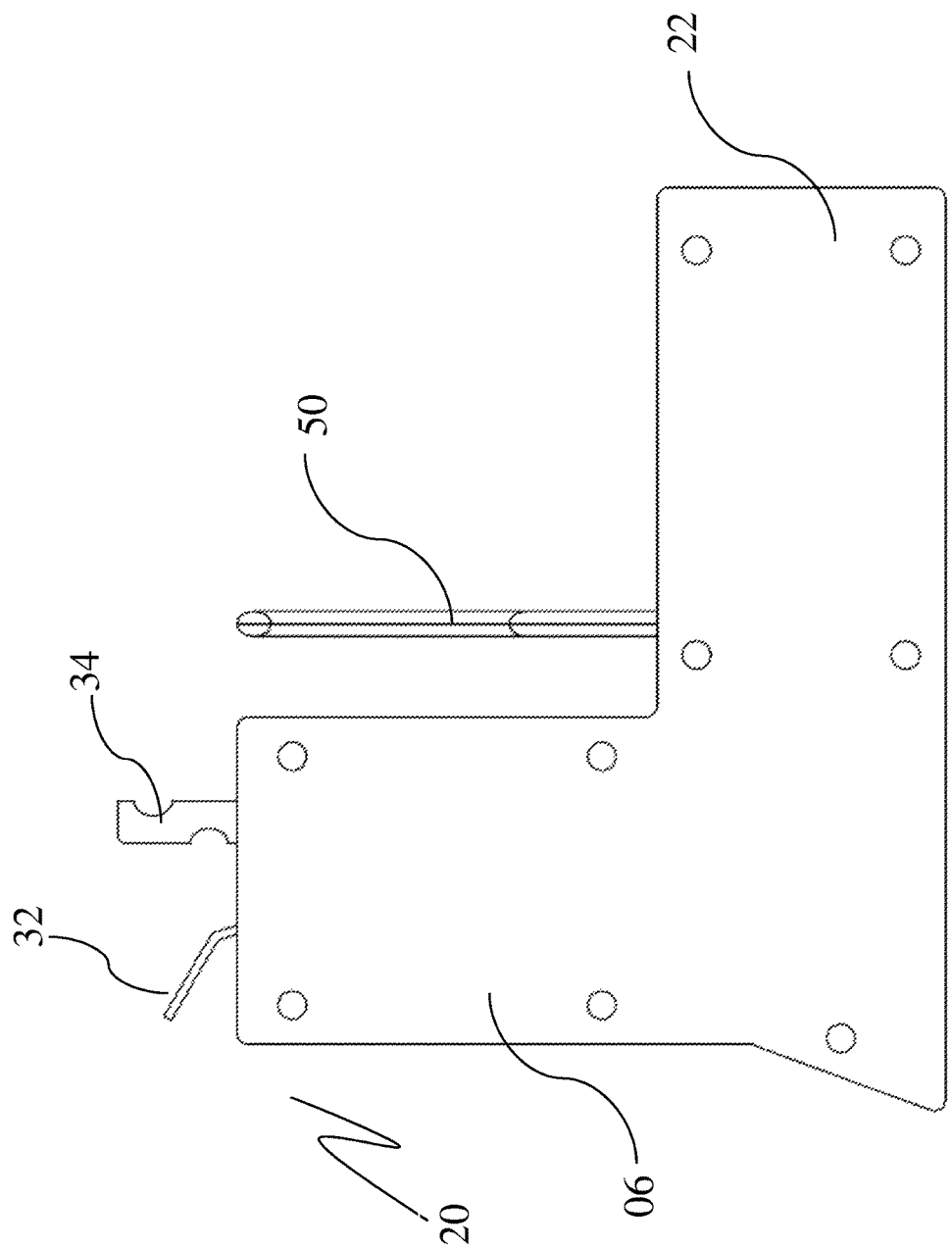
FIG. 5 illustrates a first side view of the document forgery detection system of FIG. 1.
Figure 6:
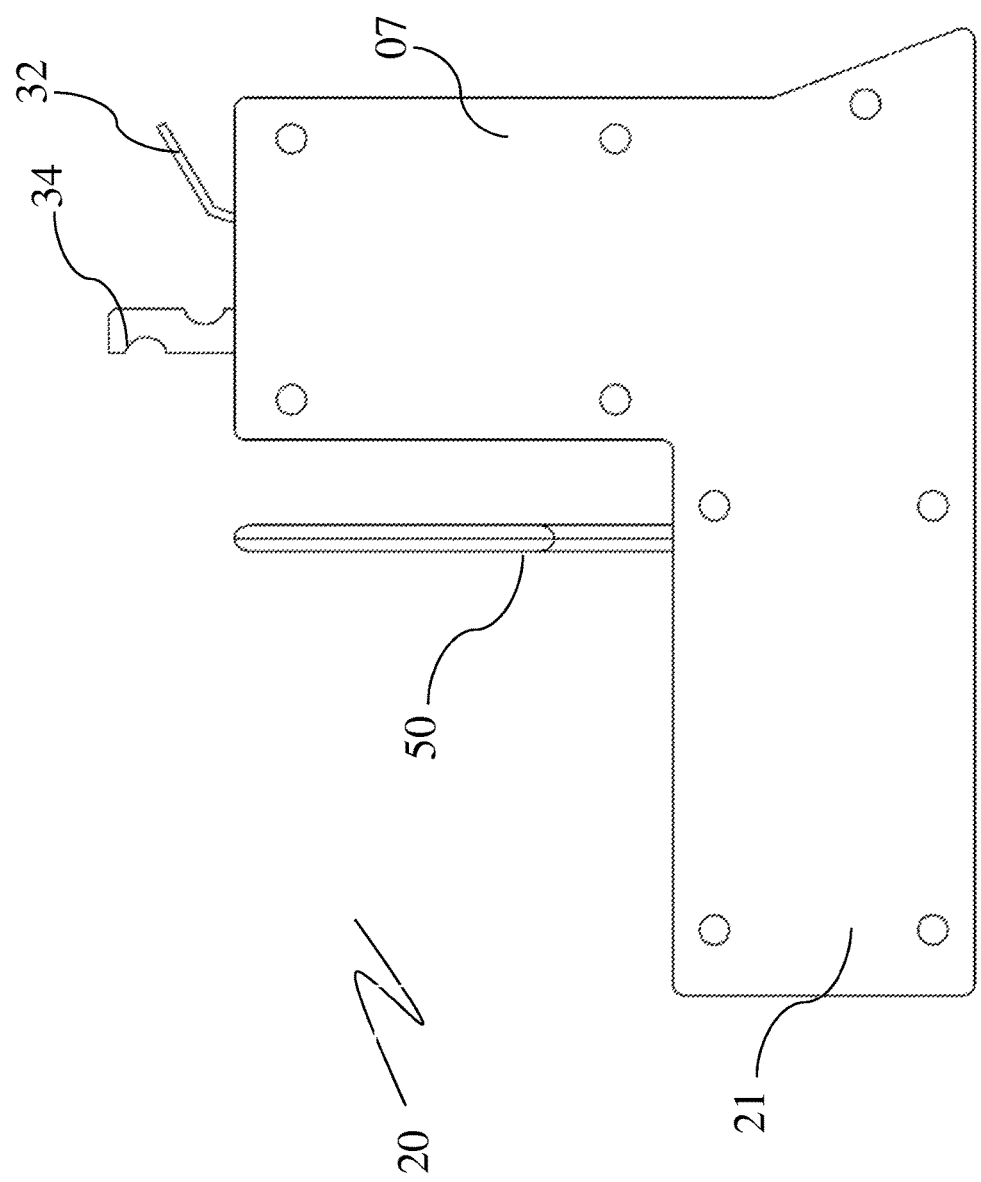
FIG. 6 illustrates a second side view of the document forgery detection system of FIG. 1.
Figure 7:
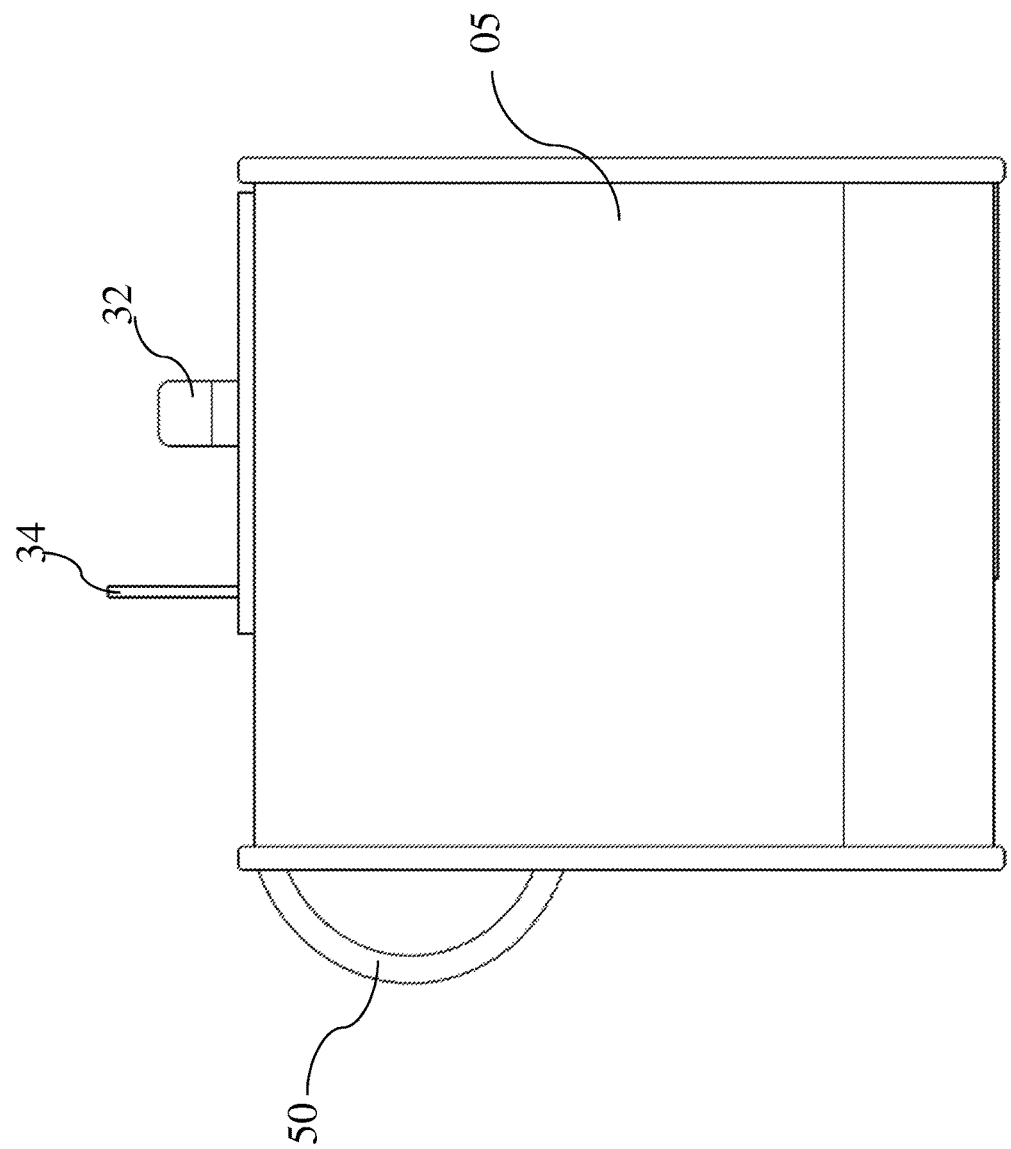
FIG. 7 illustrates a back side view of the document forgery detection system of FIG. 1.
Figure 8:
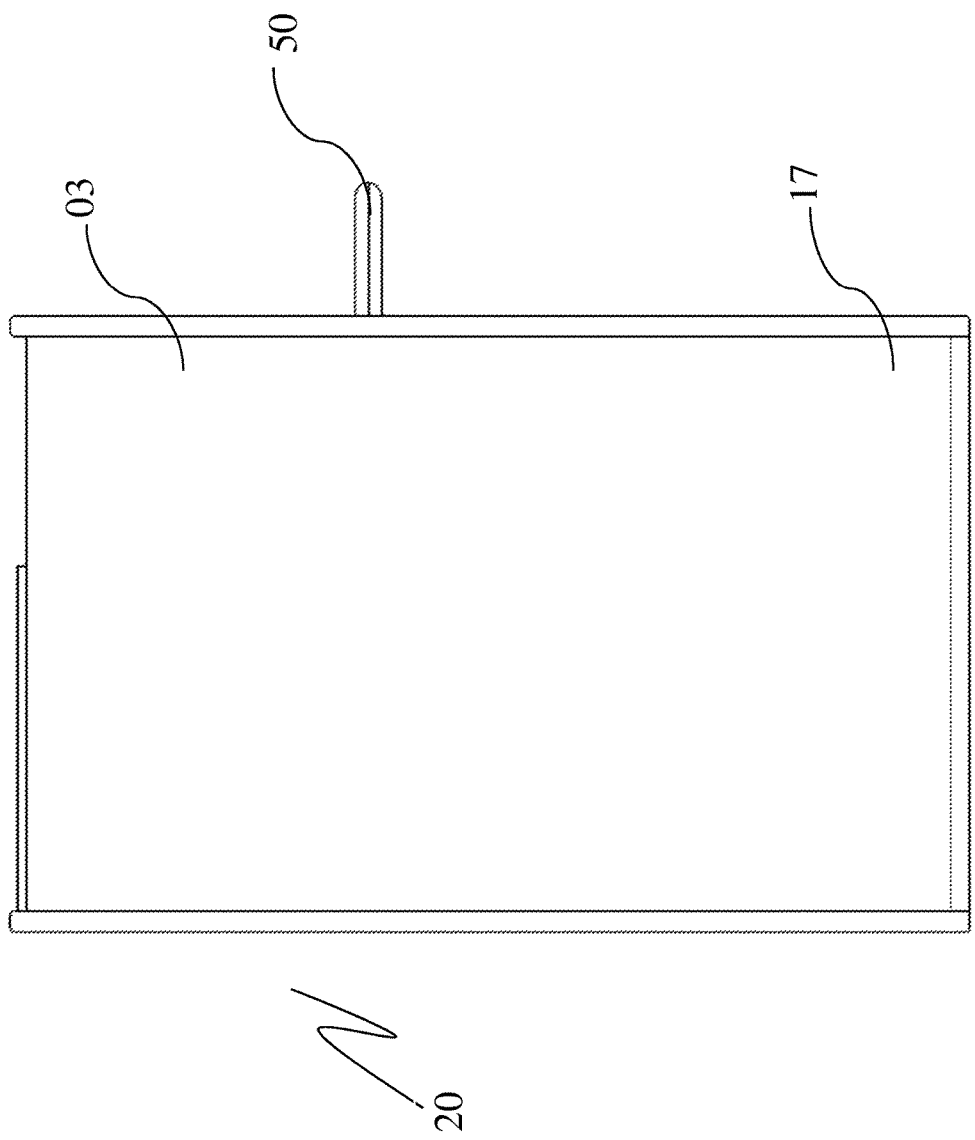
FIG. 8 illustrates a bottom view of the document forgery detection system of FIG. 1.

In an embodiment of the invention, referring to FIGS. 1 and 2, the housing 70 has a top portion 16, a base portion 17, a front portion 18, a rear portion 19, a first side portion 22 and a second side portion 21. In an embodiment of the invention the opening is located at the housing 70 front portion 18. When the scanning device 14 is mounted and in operation, the housing 70 front portion 18 is adapted to be oriented facing the operator for enabling the latter to position the document 134 facing the scanning screen 72 for scanning. The visible light camera 104 and the UV camera 106 are adapted to be mounted inside the housing 70 and oriented in the direction of the scanning screen 72 for capturing an image of the document 134 when placed on the scanning screen 72.

In an embodiment of the invention, the scanning device 14 is adapted for passport verification. In an embodiment of the invention, referring to FIGS. 1 to 4, the housing front portion 18 of the housing 70 forms a 90 degrees angle with the housing top portion 16, and the housing top portion 16 has a peripheral edge along its periphery with the housing front portion 18. In an embodiment of the invention, the display has an upper edge adapted to be in an abutting position with the top portion 16 peripheral edge such that the scanning screen 72 extends downwardly starting from the housing top portion 16 peripheral edge towards the housing base portion 17. This configuration is adapted to enable the positioning of passport in an unfolded position (according to the angle between housing 70 the front 18 and top portions 16) such that a first part of the passport is supported by the housing top portion 16 while the second part extends downwardly along the scanning screen 72 in the direction of the housing base portion 17. The second part extending/hanging downwardly would comprise the document/page 134 to be scanned which would be in an abutting facing position with the scanning screen 72.

In an embodiment of the invention, at least a part of the scanning device 14 housing top portions 16 is adapted to receive support the verification device 15 base portion 03.

Figure 14:
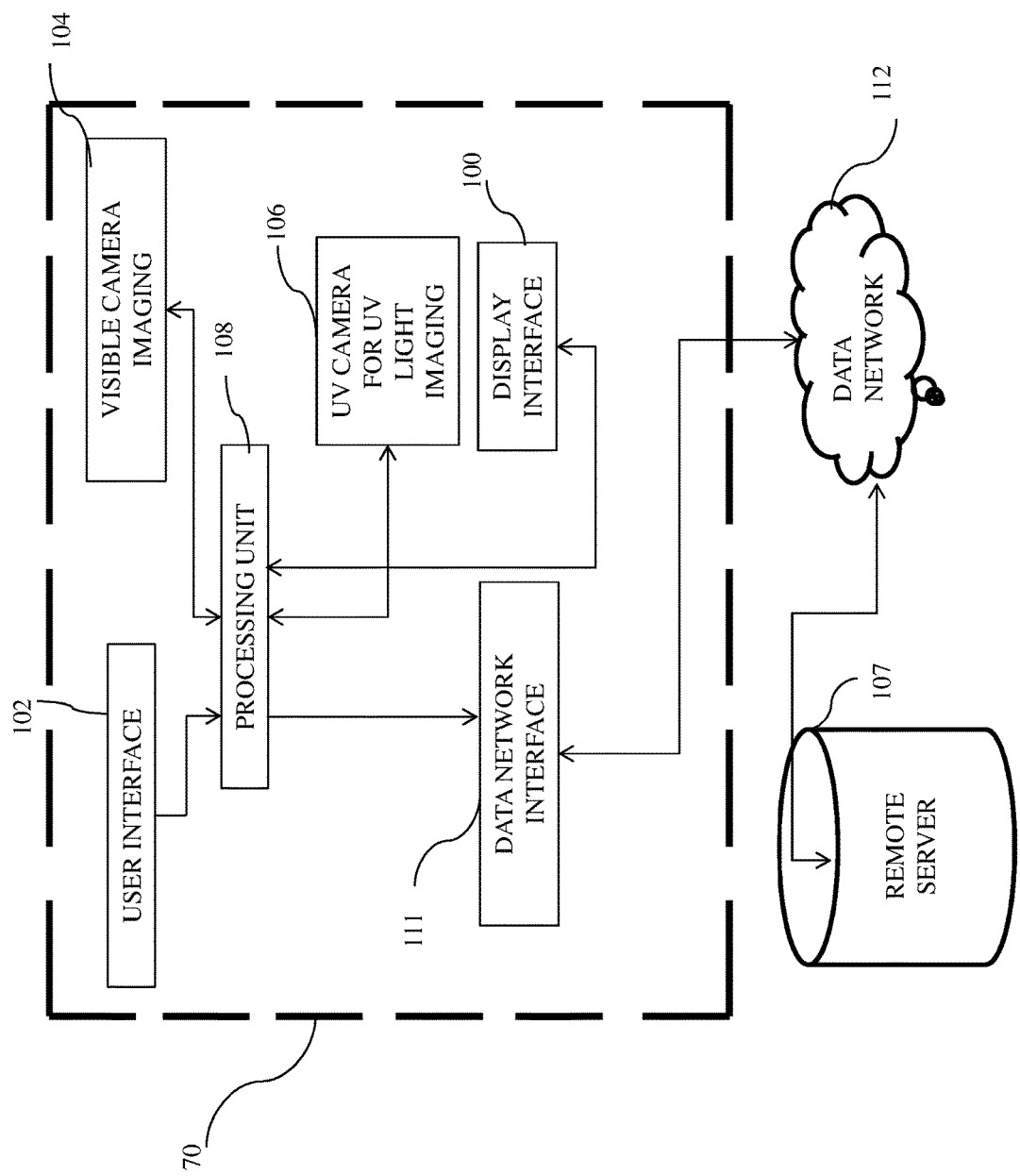
FIG. 14 is a block diagram illustrating the operational components of a scanning device in accordance with an embodiment of the invention.

In an embodiment of the invention, referring to FIG. 14, the processing unit 108 is adapted to be connected to the visible light camera 104 for activating the camera and obtaining an image of the document 134 being scanned. The processing unit 108 is adapted to generate a white/black image and a colored image of the document 134. The processing unit 108 is further adapted to be connected to the UV camera 106 for activating the camera and for obtaining a UV image of the document 134. The processing unit 108 is also adapted to be connected to the data network interface 111 for requesting and obtaining images of the original document from a remote server 107 associated with the relevant authority. The memory is adapted to store the obtained images from the database 107 and from the cameras 104 and 106.

In an embodiment of the invention, referring to FIGS. 1 to 4 and 14, the scanning device 14 is adapted to have enhanced scanning and document comparison functionalities where the document 134 is scanned using the visible light camera 104 and the UV light camera 106 for obtaining three images respectively in white/black, ultraviolet and color. The three images of the document 134 are then compared respectively to a white/black image, an ultraviolet image and a colored image of the original document requested and obtained by the processing unit 108 from the remote server 107. The power supply unit is adapted to supply power to the various electrical/electronic components of the device 14.

In an embodiment of the invention, referring to FIG. 14, the processing unit 108 is adapted to be connected to a display 100 for displaying to the operator the images received of the original document in comparison to the scanned images obtained. Preferably, comparison results between the three images associated with the scanned document 134 in black/white, ultraviolet and color are compared to the three images associated with the original document in black/white, ultraviolet and color respectively and displayed to the operator.

In an embodiment of the invention, referring to FIG. 14, the scanning device 14 user interface 102 is adapted to receive a decision signal from the operator as to whether the document 134 is approved or rejected and for transmitting the decision signal to the processing unit 108 of the scanning device 14, wherein the processing unit 108 of the scanning device 14 is connected to the verification device 15 for receiving a confirmation signal that the visible light source 130 and the ultraviolet light source 90 have been activated confirming that the verification of the document 134 by the operator using the verification device 15 before approving the operator decision.

In an embodiment of the invention, referring to FIG. 2, there is provided a scanning device 14 in accordance with the various embodiments of the invention. In an embodiment of the invention, referring to FIG. 2, there is provided a verification device 15 in accordance with the various embodiments of the invention. In an embodiment of the invention, referring to FIGS. 1 and 2, there is provided a document forgery detection system 20 comprising a combination of the scanning device 70 and the verification device 10 in accordance with the various embodiments of the invention.

The document forgery detection system 20, referring to FIG. 1, is adapted to verify a large number of official documents such as passports, visas, travel tickets, car licenses, currency note and other bank notes, identification documents, and so on.

The document forgery detection system 20, can be used in a public sector and areas of national importance by armed forces at borders, immigration control, police stations, ministries and other places of public interest for identification purpose and can be installed in the private sector like banks to verify the genuineness of currency notes, official bills, shops, and also in private organization requiring the use of identification cards for security and land access purpose.

The invention claimed is:

1. A verification device comprising:
a verification device housing having a front portion, a rear portion, a top portion and a base portion;
a document receiver for receiving a document for verification having a document front portion and a document rear portion extending along a document plan, the document receiver being positioned between the housing front portion and the housing rear portion such that the document front portion faces the verification device housing front portion and the document rear portion faces the verification device housing rear portion when inserted inside the reader;
a visible light source positioned between the document reader and the verification device housing rear portion adapted to project visible light from behind the document in direction of the rear portion of the document for enabling reflectance of visible light embedded marks inside the document;
an ultraviolet light source positioned between the document reader and the verification device housing front portion adapted to project ultraviolet light from in front the document in direction of the front portion of the document for enabling reflectance of ultraviolet light embedded marks inside the document;
a screen comprising a display defined within the verification device housing front portion, the display having an optically transparent material for enabling visualization of the visible light embedded marks and the ultraviolet light embedded marks to an operator during operation of the verification device; and
a power supply unit adapted to supply power to the visible light source and to the ultraviolet light source.

2. The verification device of claim 1 wherein the document receiver comprises a support member having a support member plan adapted to provide a support to the document along the support member plan when the document is inserted inside the document receiver such that the document plan extends along the support member plan.

3. The verification device of claim 2, wherein the document receiver further comprises an inclination angle adjuster for adjusting an inclination angle of the document with respect to the projected visible white and ultraviolet light in order to enable improving the reflectance of the visible light exposable embedded marks and the ultraviolet light exposable embedded marks for visualization by the operator through the display.

4. The verification device of claim 3, wherein the document receiver is adapted to receive the document through a first housing opening defined in the verification device housing top portion, and wherein the inclination angle adjuster comprises an angle adjuster handle extending outwardly from the housing first opening for enabling the operator to adjust the inclination angle.

5. The verification device of claim 4, wherein the document receiver further comprises a document holder adapted to secure the document plan in place along the support member plan.

6. The verification device of claim 5, wherein the document holder comprises a string and is adapted to be in a relaxed position when the document receiver is empty and to be in a tensed position when the document is inserted inside the document receiver for enabling the document to remain in place with the document plan coinciding with the support member plan when inserted.

7. The verification device of claim 1, wherein the visible light source is mounted on the verification device housing rear portion.

8. The verification device of claim 1, wherein the ultraviolet light source is mounted on the verification device housing front portion.

9. The verification device of claim 1, wherein the screen comprises a frame extending around the display, the frame being adapted to be mounted to the verification device housing front portion within a housing second opening defined in the verification device housing front portion such that that the housing second opening is completely obstructed by the screen, and wherein the ultraviolet light source is mounted on the frame.

10. The verification device of claim 9, wherein the ultraviolet light source comprises a first ultraviolet light source having a first ultraviolet scale index and a second ultraviolet light source having a second ultraviolet scale index different from the first scale index.

11. The verification device of claim 10, wherein the first ultraviolet light source is mounted on a top edge of the frame and the second ultraviolet light source is mounted on a bottom edge of the frame.

12. The verification device of claim 11, wherein the first ultraviolet scale index is 1 and the second ultraviolet scale index is between 3 and 6.

13. The verification device of claim 1, wherein the display optically transparent material is made of glass or plastic.

14. The verification device of claim 1, further comprising a magnifier apparatus comprising a magnifier comprising a magnifying glass lens for enabling the enlargement of visible light exposable embedded marks and a red lens for enabling the visualization of ultraviolet light exposable embedded marks.

15. The verification device of claim 14, wherein the magnifier apparatus further comprises a flexible support member adapted to be coupled to the magnifier from one end and to be coupled to the verification housing from another end, wherein the flexible support member is adapted to flex for enabling the operator to move the magnifier in proximity and away from the display as required.

16. The verification device of claim 1, wherein the document is a passport, a visa document, an identification document, a currency note or a bank note.

17. The verification device of claim 1, wherein the verification device further comprises a selector for enabling the operator to select and activate a desirable light source among the light sources.

18. A document forgery detection system comprising the verification device of claim 1 and further comprising;
- a scanning device comprising:
- a scanning device housing having a front portion, a rear portion, a top portion and a base portion;
- an optically transparent scanning screen defined within the scanning device housing front portion such that an upper edge of the scanning screen is in abutment position with a peripheral edge of the scanning device housing top portion for enabling a first document part to be supported on the scanning device top portion and a second document part to extend downwardly facing the scanning screen;
- a visible light camera mounted inside the scanning device housing and oriented in direction of the scanning screen for capturing a visible light image of the document second part when extended facing the scanning screen;
- a ultraviolet camera mounted inside the scanning device housing and oriented in direction of the scanning screen for capturing an ultraviolet image of the document second part when extended facing the scanning screen;
- a data network interface adapted to be connected to a remote server through a data network;
- a user interface;
- a processing unit adapted to be connected to the visible light camera, the ultraviolet camera, the data network interface and the user interface for obtaining a visible light image and an ultraviolet image of the document being verified, for extracting a visible light image and ultraviolet image of the original document from the remote server, for comparing the visible light and ultraviolet images of the document being verified with the visible and ultraviolet images of the original document for determining if there is a match, and for displaying comparison results to the operator through the user interface, the comparison results comprising a window of images displaying the visible light image of the verified document next to the visible light image of the original document and the ultraviolet image of the verified document next to the ultraviolet image of the original document, wherein the visible light image comprises a black/white image and a colored image; and
- a power supply unit adapted to supply power to the cameras and to the processing unit.

19. The document forgery detection system as claimed in claim 18, wherein the verification device is adapted to be mounted on the scanning device such that at least a part of the scanning device top portion is adapted to receive and support at least a part of the verification device base portion.

20. The document forgery detection system as claimed in 18, wherein the scanning device user interface is adapted to receive a decision signal from the operator as to whether the document is approved or rejected and for transmitting the decision signal to the processing unit of the scanning device, wherein the processing unit of the scanning device is connected to the verification device for receiving a confirmation signal that the visible light source and the ultraviolet light source have been activated confirming that the verification of the document by the operator using the verification device before approving the operator decision.

* * * * *